United States Patent [19]
Kenjo et al.

[11] Patent Number: 5,179,304
[45] Date of Patent: Jan. 12, 1993

[54] LINEAR MOTOR SYSTEM

[75] Inventors: Atsushi Kenjo, Takasaki; Takashi Kataoka, Maebashi, both of Japan

[73] Assignee: NSK Ltd., Tokyo, Japan

[21] Appl. No.: 738,312

[22] Filed: Jul. 23, 1991

[30] Foreign Application Priority Data

Jul. 26, 1990 [JP] Japan .................. 2-200077

[51] Int. Cl.⁵ ............................ H02K 41/00
[52] U.S. Cl. ........................ 310/12; 310/88
[58] Field of Search ........... 310/12, 85, 88, 40 MM; 49/360

[56] References Cited

FOREIGN PATENT DOCUMENTS

| 0081968 | 4/1987 | Japan | 310/12 |
|---|---|---|---|
| 63-180443 | 7/1988 | Japan . | |
| 0249459 | 10/1988 | Japan | 310/12 |

*Primary Examiner*—Steven L. Stephan
*Assistant Examiner*—Judson H. Jones
*Attorney, Agent, or Firm*—Shapiro and Shapiro

[57] ABSTRACT

A linear motor system includes a base fixedly provided, a stator fixed on the base with fixed teeth and grooves alternately formed in a longitudinal direction thereof, each of the grooves being filled with filler made of non-magnetic material, a flat thin film made of non-magnetic material and covering the end surfaces of the fixed teeth and filler, a moving member movably mounted on the stator and having plural magnetic poles formed in a traveling direction of the moving member, each magnetic pole having a coil wound thereabout and plural magnetic pole teeth, a table attached to the moving member for movement therewith, and a dust particle removing member fixed to one end of the moving member in the traveling direction thereof and having a tip end closely disposed to, but not touching, the thin film.

14 Claims, 5 Drawing Sheets

LINEAR MOTOR SYSTEM

BACKGROUND OF THE INVENTION

1. Field of the Invention

The present invention relates to an improvement of a linear motor system having such a structure that one of a movable body and a fixed body is provided with magnetic pole teeth and the other with the teeth facing the aforesaid pole teeth a fine gap, and in which the movable body travels while the aforesaid pole teeth and teeth face each other.

2. Related Background Art

A linear motor system used for the table carrier of a conventional machine tool or the like is provided with a movable body having a plurality of magnetic pole teeth and a fixed body having a plurality of fixed teeth, and the aforesaid movable body is structured to be movable along the aforesaid fixed body (as disclosed in Japanese Patent Laid-Open Appln. No. 63-180443, for example). In the above-mentioned conventional linear motor system, a scraping member is installed on the movable body, and is slidably in contact with a dust cover for protecting the grooves between the fixed teeth of the fixed body. The scraping member acts to scrape off the dust deposited on the surface of the dust cover, thus preventing the ingression of any foreign substances such as dirt and dust into the space between the movable body and the fixed body.

Generally speaking, in order to improve the thrust in a linear motor system of the aforementioned type, the gap (space) between the magnetic pole teeth of the movable body and fixed teeth of the fixed body should desirably be narrowed. Traditionally, therefore, these bodies are constructed to face each other through a narrow gap after the surfaces of both teeth have been finished by an abrasive machining.

However, because the gap is extremely narrow, it is likely to catch dust particles, and there is a risk that surfaces of the fixed teeth of the fixed body and the magnetic pole teeth of the movable body will be damaged by the dust particles caught therebetween. In addition, the above-mentioned surfaces of the magnetic pole teeth and fixed teeth which are finished by the abrasive machining are exposed directly to the atmosphere. Therefore, corrosion or rust tends to occur on the aforesaid surfaces. Also, if this linear motor system is used in a clean room or in a vacuum, there is a problem that the exposed magnetic pole teeth and fixed teeth generate dust particles or gas.

Accordingly, in the above-mentioned conventional linear motor system, the dust cover and scraping member are provided. Nevertheless, there is still a disadvantage that the thrust of the linear motor system is reduced due to the friction resistance between the surface of the aforesaid dust cover and the above-mentioned scraping member which is slidably in contact therewith in order to prevent the ingression of the dust particles into the above-mentioned gap.

SUMMARY OF THE INVENTION

The present invention is made to solve these problems of the conventional system, and an object thereof is to provide a linear motor system capable of preventing the ingression of dust particles into the gap without lowering the thrust of the linear motor system.

Another object of the present invention is to provide a linear motor system having improved corrosion-resistant and rust inhibiting surfaces of the pole teeth and fixed teeth as well as being capable of reducing the generation of dust particles and gas in a vacuum atmosphere.

In order to achieve the above-mentioned objects, the linear motor system of the present invention may comprise:

a rail type base provided at a fixed position;

a stator mounted on said base and having an upper face with a plurality of fixed teeth and grooves formed alternately in the longitudinal direction of the stator, and a filler made of non-magnetic material filled in each of the grooves;

a flat thin film made of non-magnetic material covering the upper surfaces of the fixed teeth of said stator and the upper surfaces of said filler;

a moving member mounted movably on said stator through linear bearings and having a plurality of magnetic poles formed in the traveling direction, each of the poles having a coil wound thereabout and a plurality of magnetic pole teeth formed at the lower face thereof;

a table attached to said moving member; and a dust particle removing member fixed to one end of said moving member in the traveling direction and having a tip end provided closely to, but not touching, said thin film.

Also, according to another aspect of the invention, the linear motor system may comprise:

a rail type base provided at a fixed position;

a stator mounted on said base and having a plurality of magnetic poles formed in the longitudinal direction thereof, each magnetic pole having a coil wound thereabout and a plurality of magnetic pole teeth formed at the upper face thereof;

a moving member mounted movably on said stator through linear bearings and having a plurality of teeth formed in the traveling direction at the lower face thereof;

a table attached to said moving member;

a flat thin film made of non-magnetic material provided on said moving member and covering the teeth of said moving member; and a dust particle removing member fixed to said stator and having a tip end provided closely to, but not touching, the thin film of said moving member.

According to still another aspect of the invention, the linear motor system may comprise:

a fixed base;

a moving member movably mounted to said base through linear bearings and cooperable rails;

one of said base and said moving member having a plurality of magnetic poles arranged along a line of travel of said moving member, each magnetic pole having a plurality of pole teeth arranged along said line of travel, the other of said base and said moving member having teeth arranged along said line of travel with end surfaces in opposition to end surfaces of said magnetic pole teeth;

a flat thin film of non-magnetic material provided on said other of said base and said moving member and covering said end surfaces of the respective said teeth thereof; and a pair of dust particle removing members provided at opposite end portions of said one of said base and said moving member as considered along said line of travel, each dust particle removing member having a tip end disposed sufficiently close to said thin film to remove dust therefrom, but not touching said thin film.

In an especially preferred form of the invention, the non-magnetic filler material is filled in the respective cavities or recesses between the magnetic poles, between the magnetic pole teeth, and between the teeth opposing the magnetic pole teeth; and a pair of flat thin films is provided.

In the system of the present invention, the movable body travels along the fixed body while the teeth of the movable body and fixed body are facing each other and at least the magnetic pole teeth or the teeth opposite thereto are covered with the thin film made of non-magnetic material. The dust particle removing plate is arranged sufficiently close to the thin film to remove dust therefrom, but not in contact with the thin film.

As will be more fully appreciated hereinafter, it is possible according to the invention to prevent the ingression of the dust particles adhering to either the fixed body or movable body into the aforesaid gap, without lowering the thrust of the linear motor system. It is also possible to prevent corrosion on the surfaces of the magnetic pole teeth and the opposing teeth and to reduce the generation of dust particles and gas in a vacuum atmosphere.

DESCRIPTION OF THE PREFERRED EMBODIMENTS

Hereinafter, in conjunction with the accompanying drawings, preferred embodiments of the present invention will be described.

Figure 1:
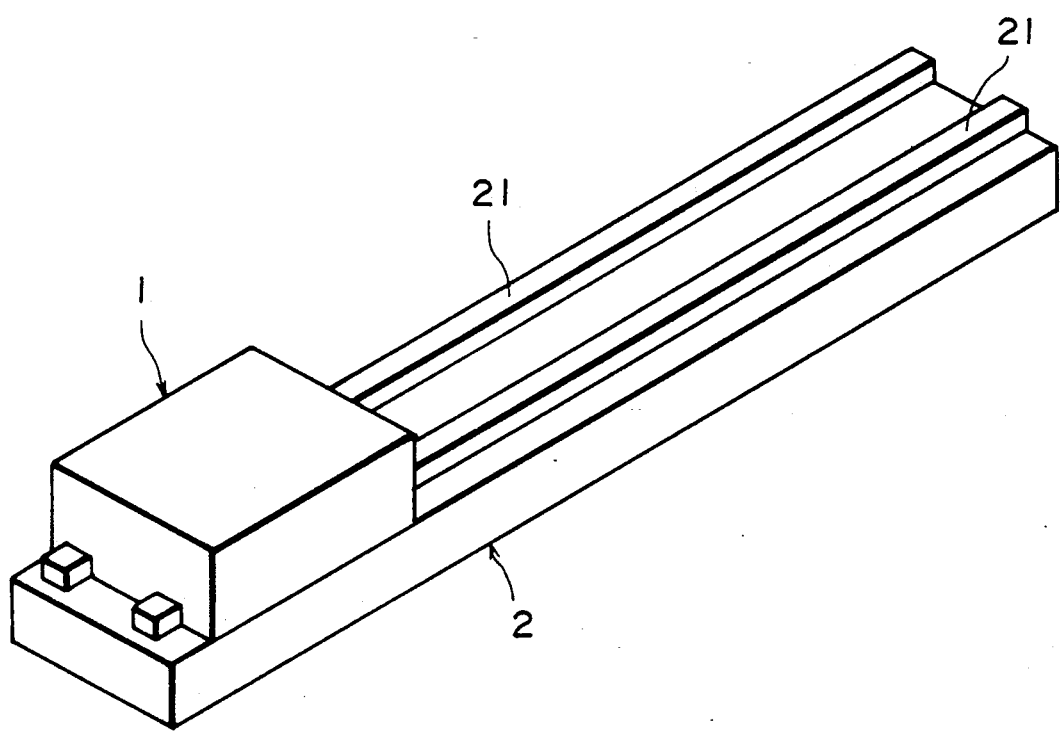
FIG. 1 is a perspective view showing an embodiment of the linear motor system according to the present invention.

As shown in FIG. 1, the linear motor system comprises an elongate fixed body 2 fixedly arranged with a pair of guide rails 21 mounted on the upper surface thereof, and a block type movable body 1 mounted movably thereon through linear bearings. More particularly, as shown in FIG. 2, the fixed body 2 comprises a rail type base 5 and a stator 6 which is fixed on the upper surface thereof, while the movable body 1 comprises a table 4 and a moving member 3 which can be fixed on the upper face thereof.

Figure 3:
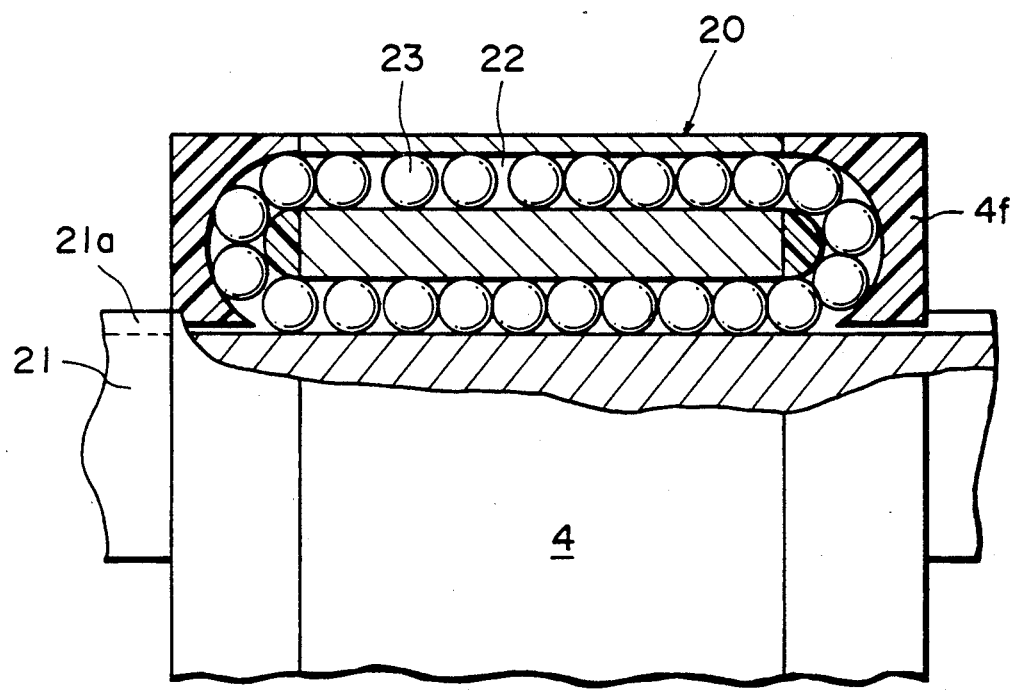
FIG. 3 is a partially cutaway plan view of the movable body.

The moving member 4 has sleeve portions 4f on both sides thereof (only one side sleeve portion shown), at each of which a linear bearing 20 is arranged as shown in FIG. 3. In detail, on each rail 21 a rolling groove 21a is formed, while on the corresponding sleeve portion 4f, a loop type ball circulating path 22 is formed, and many balls 23 are filled therein.

Figure 2:
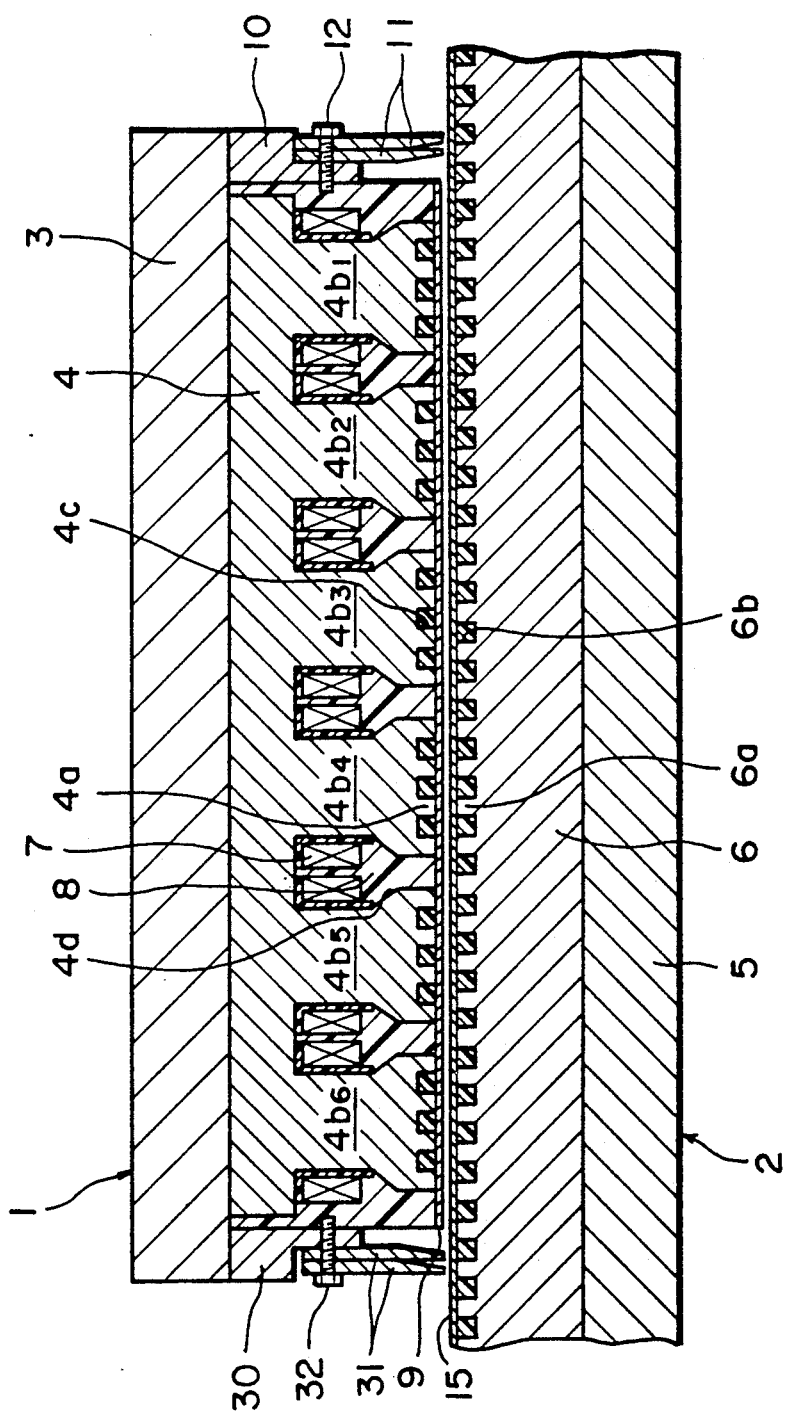
FIG. 2 is a longitudinally sectional view thereof.

As shown in FIG. 2, on the side of the moving member 4 facing the stator 6, there are formed at a constant pitch in the traveling direction of the movable body 1 a plurality of magnetic poles $4b_1$–$4b_6$ with a plurality of magnetic pole teeth $4a$ of different pitch, each of which is provided at intervals in the traveling direction of the movable body 1. Additionally, on the side of the stator 6 facing the moving member 4, fixed teeth $6a$ which face the aforesaid magnetic pole teeth $4a$ are formed at constant pitch in the traveling direction of the movable body 1. Further, a magnetic coil 7 is wound around each of the magnetic poles $4b_1$–$4b_6$ of the aforesaid moving member 4 to constitute the driving unit of the linear motor system in cooperation with the magnetic poles $4b_1$–$4b_6$.

Figure 4:
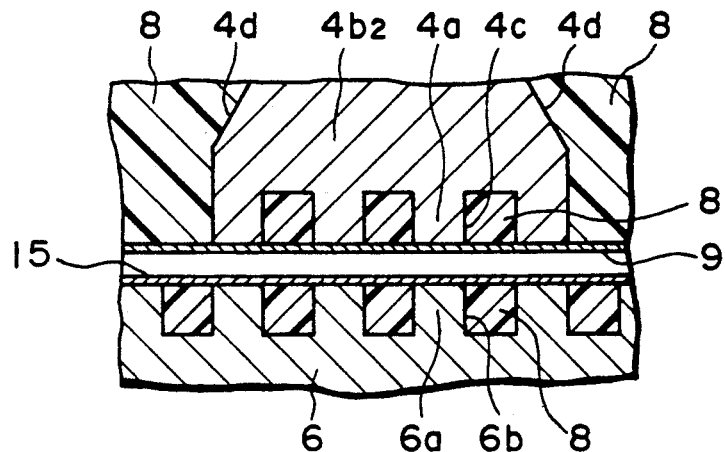
FIG. 4 is an enlarged cross-sectional view showing the portion in vicinity of one magnetic pole of the system shown in FIG. 1.

As shown in FIG. 4, a filler 8 made of non-magnetic material such as epoxy resin and the like is filled in each of the grooves $4c$ formed between the aforesaid pole teeth $4a$ and each of the plural recesses $4d$ between the aforesaid magnetic poles $4b_1$–$4b_6$, as well as in each of the plural grooves $6b$ formed between the aforesaid teeth $6a$. The filler in grooves $4c$ and recesses $4d$ is flush with the ends (lower surfaces) of pole teeth $4a$, and the filler in grooves $6b$ is flush with the ends (upper surfaces) of fixed teeth $6a$. The lower surfaces of the aforesaid magnetic pole teeth $4a$ and of the filler 8 in the grooves $4c$ and the recesses $4d$ are finished by abrasive machining, and a flat thin film 9 made of non-magnetic material is bonded to the finished surfaces. The non-magnetic material for this thin film 9 could desirably be one having a low gasifying rate, such as stainless. Likewise, to the upper surfaces of the aforesaid fixed teeth $6a$ and of the filler 8 in the grooves $6b$, a flat thin film 15 is bonded. The dimension of the space 25 between the thin films 9 and 15 is indicated as B (refer to FIG. 5).

Figure 5:
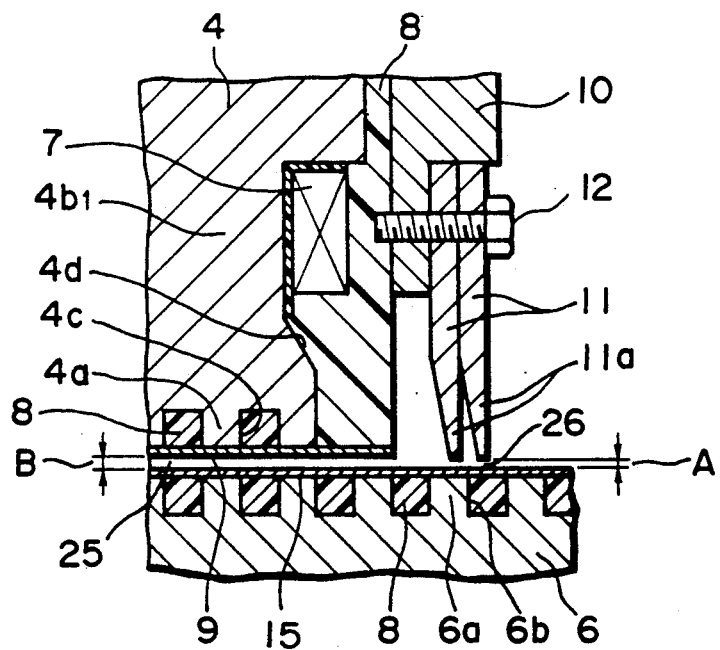
FIG. 5 is an enlarged cross-sectional view showing the portion in vicinity of the dust particle removing plate of the system shown in FIG. 1.

As shown in FIG. 2 and FIG. 5, dust removing plates 11 and 31 are installed by bolts 12 and 32 on each of supporting members 10 and 30 fixed on the front and rear ends of the aforesaid movable body 1 by utilizing the filler 8. The tip end $11a$ of the dust removing plate 11 is arranged as shown in FIG. 5 in such a manner that the dimension A of the space 26 between the aforesaid tip end $11a$ and the thin film 15 on the stator 6 is narrower than the dimension B of the space 25, and that the tip end does not touch the thin film 15 on the stator 6 side. The same arrangement is also applicable to the dust removing plate 31.

With the structure mentioned above, the linear motor system enables the movable body 1 to be advanced at a constant pitch by the magnetic attraction which is generated between each of the magnetic poles $4b_1$–$4b_6$ of the moving member 4 and the fixed teeth $6a$ of the stator 6 when the magnetic coils 7 are sequentially energized by a pulse generating source (not shown). In detail, when the moving body 1 moves leftwardly in FIG. 2, for example, the magnetic poles $4b_1$ and $4b_4$ are at first magnetically energized to thereby move the moving body 1 by ¼ pitch due to magnetic interaction between the above magnetic poles and corresponding fixed teeth $6a$. Then the magnetic poles $4b_3$ and $4b_6$ are magnetically energized to effect movement by ⅓ pitch, and then the magnetic poles $4b_2$ and $4b_5$ are magnetically energized to effect movement by ⅓ pitch, and so on continuously. The position of the moving body 1 is detected by a position sensor (not shown) to control the position of moving body 1 based on the detected result.

With the traveling of the movable body 1, one dust removing plate 11 or 31, which is provided on the front side in the traveling direction, serves to prevent the ingression of the dust particles adhering to the thin film 15 on the stator 6 into the space 25. In the present embodiment, the tip ends of the dust removing plates 11 and 31 do not touch the thin film 15. Therefore, the thrust of the linear motor is not reduced by friction resistance between the tip ends and the thin film 15. Furthermore, as the dimension A of the space 26 between the tip ends and the thin film 15 is made narrower than the dimension B of the space 25 (A<B), any dust particles which are large enough to damage the thin films 9 and 15 can be swept off effectively.

Also, since the respective grooves 4c and 6b of the aforesaid moving member 4 and stator 6 and the recesses 4d between the magnetic poles 4b are filled with the filler 8, the burring caused by the abrasive machining becomes small. Moreover, because the ends of the magnetic pole teeth 4a and the lower surfaces of the filler 8 in the grooves 4c and recesses 4d are machined flush, and further because the ends of the fixed teeth 6a and the upper surfaces of the filler 8 in the grooves 6b are machined flush, the aforesaid thin films 9 and 15 can be made extremely thin to provide flat coverings. Thus, it is possible to make the aforesaid gap 25 very narrow, so that the thrust of the linear motor system can be improved.

Further, as subsequent to filling each of the aforesaid grooves 4c and 6b and recesses 4d with the filler 8, the exposed wall sides of these grooves and recesses and the surfaces (lower ends) of the magnetic pole teeth 4a and the surfaces (up-per ends) of the fixed teeth 6a are respectively covered with the thin films 9 and 15, it is possible to prevent corrosion of each of the surfaces of the aforesaid teeth and the wall sides of grooves and, at the same time, to reduce the generation of dust particles in a vacuum atmosphere in a clean room and the like or the generation of gas from the remainder of any rust preventing oil or cleaning oil.

While the thin film to protect the filler and teeth is provided for both the movable body and the fixed body in the present embodiment, applying a thin film to only one of them may also provide an adequate effect of reducing the generation of dust particles and gas. For example, it may be sufficient to omit the thin film on the fixed body side from the viewpoint of dust particle generation, because the fixed body side is less affected thereby.

Figure 6:
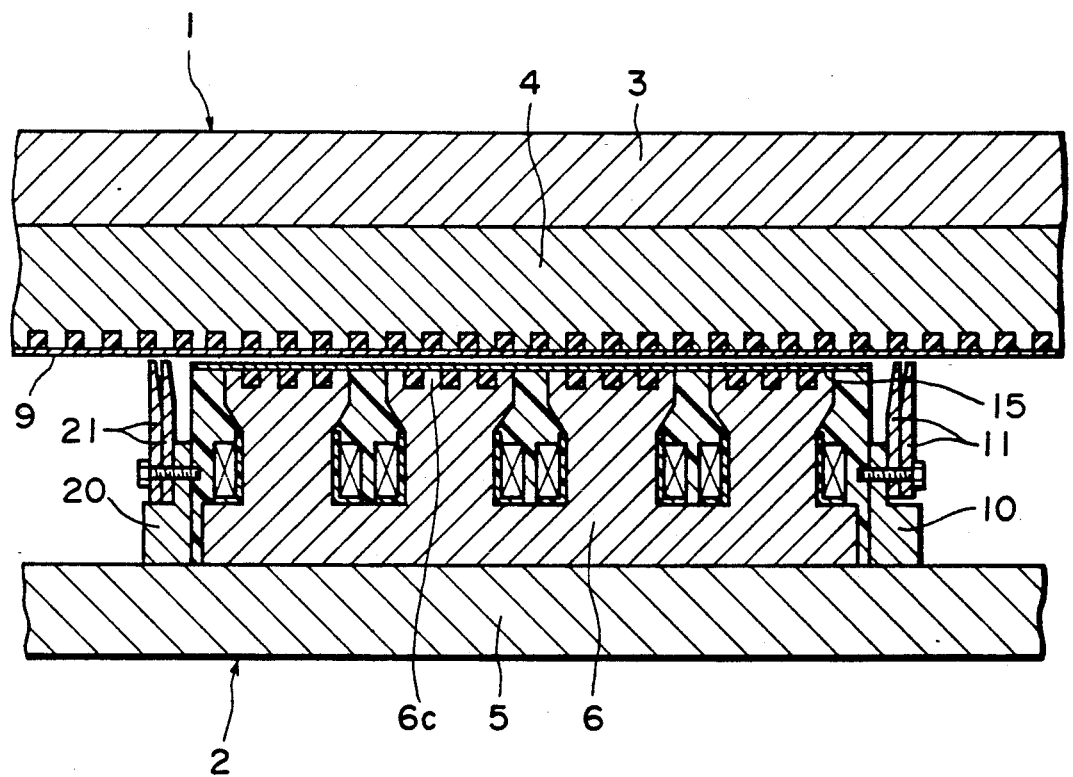
FIG. 6 is a longitudinally sectional view showing another embodiment of the linear motor system according to the present invention.

The movable body may, of course, be driven by micro-step driving rather than by synchronous driving FIG. 6 is a view showing another embodiment of the linear motor system of the present invention, which differs from the embodiment shown in FIG. 1 primarily in that the magnetic pole teeth 6c and the dust removing plates 11 and 31 are arranged on the fixed body 2 and not on the movable body 1. With a structure arranged such as the present embodiment, the linear motor system can function in the same manner as the first embodiment, and the dust removing plates 11 and 31 can sweep off the dust particles adhering to the thin film 9 on the movable body 1 as the movable body 1 travels.

We claim:

1. A linear motor system, including:
   a rail type base fixedly provided;
   a stator fixed on said base and having an upper face with fixed teeth and grooves alternately formed in a longitudinal direction of said stator, each of the grooves being filled with filler made of non-magnetic material;
   a flat thin film of non-magnetic material provided on said stator and covering upper surfaces of said fixed teeth and upper surfaces of said filler;
   a moving member mounted movably on said stator through linear bearings and having a plurality of magnetic poles formed along a line of travel of said moving member, each magnetic pole having a coil wound thereabout and a plurality of magnetic pole teeth formed on a lower face thereof;
   a table attached to said moving member for movement therewith; and
   a pair of dust particle removing members fixed respectively to opposite ends of said moving member as considered along said line of travel, each dust particle removing member having a tip end disposed sufficiently close to said thin film to remove dust therefrom, but not touching said thin film.

2. A linear motor system according to claim 1, including an additional flat thin film provided on said moving member and covering lower surfaces of said magnetic pole teeth, and wherein the distance between said tip end of each said dust particle removing member and the first-mentioned thin film is less than the distance between the first-mentioned thin film and said additional thin film.

3. A linear motor system according to claim 2, wherein recessed areas between said magnetic poles and recessed areas between said magnetic pole teeth are filled with additional filler of non-magnetic material, with lower surfaces of said additional filler also being covered by said additional thin film.

4. A linear motor system, including:
   a rail type base fixedly provided;
   a stator fixed on said base and having a plurality of magnetic poles formed in a longitudinal direction thereof, each magnetic pole having a coil wound thereabout and a plurality of magnetic pole teeth formed on an upper face thereof;
   a moving member mounted movably on said stator through linear bearings and having a plurality of teeth formed on a lower face thereof along a line of travel of said moving member;
   a table attached to said moving member for movement therewith;
   a flat thin film of non-magnetic material provided on said moving member and covering lower surfaces of said teeth of said moving member; and
   a pair of dust particle removing members fixed on said stator at spaced locations along said line of travel, each dust particle removing member having a tip end disposed sufficiently close to said thin film to remove dust therefrom, but not touching said thin film.

5. A linear motor system according to claim 4, including an additional flat thin film provided on said stator and covering upper surfaces of said magnetic pole teeth.

6. A linear motor system according to claim 4, wherein said teeth of said moving member are separated by grooves filled with non-magnetic filler which is also covered by said flat thin film.

7. A linear motor system, including:
   a fixed base;
   a moving member movably mounted to said base through linear bearings and cooperable rails;
   one of said base and said moving member having a plurality of magnetic poles arranged along a line of travel of said moving member, each magnetic pole having a plurality of pole teeth arranged along said line of travel, the other of said base and said moving member having teeth arranged along said line of travel with end surfaces in opposition to end surfaces of said magnetic pole teeth;

a flat thin film of non-magnetic material provided on said other of said base and said moving member and covering said end surfaces of the respective said teeth thereof; and a pair of dust particle removing members provided at opposite end portions of said one of said base and said moving member as considered along said line of travel, each dust particle removing member having a tip end disposed sufficiently close to said thin film to remove dust therefrom, but not touching said thin film.

8. A linear motor system according to claim 7, wherein said moving member has said magnetic poles, and wherein recessed areas between said teeth of said base are filled with non-magnetic filler which is also covered by said thin film.

9. A linear motor system according to claim 7, wherein said base has said magnetic poles, and wherein recessed areas between said teeth of said moving member are filled with non-magnetic filler which is also covered by said thin film.

10. A linear motor system according to claim 7, wherein an additional flat thin film is provided on said one of said base and said moving member so as to cover said end surfaces of said magnetic pole teeth.

11. A linear motor system according to claim 10, wherein recessed areas between said magnetic poles and recessed areas between said magnetic pole teeth are filled with non-magnetic filler which is also covered by said additional thin film.

12. A linear motor system according to claim 11, wherein recessed areas between said teeth of said other of said base and said moving member are filled with non-magnetic filler which is also covered by the first-mentioned thin film.

13. A linear motor system according to claim 12, wherein the distance between said tip end of each dust particle removing member and the first-mentioned thin film is less than the distance between that thin film and said additional thin film.

14. A linear motor system according to claim 10, wherein the distance between said tip end of each dust particle removing member and the first-mentioned thin film is less than the distance between that thin film and said additional thin film.

* * * * *